United States Patent [19]

Feldbrugge

[11] Patent Number: 5,157,673
[45] Date of Patent: Oct. 20, 1992

[54] COMPARISON CIRCUIT FOR MASKING TRANSIENT DIFFERENCES

[75] Inventor: Fredericus H. J. Feldbrugge, Apeldoorn, Netherlands

[73] Assignee: Digital Equipment Corporation, Maynard, Mass.

[21] Appl. No.: 490,128

[22] Filed: Mar. 7, 1990

[30] Foreign Application Priority Data

Mar. 7, 1989 [NL] Netherlands ................ 8900549

[51] Int. Cl.$^5$ .......................................... G06F 11/00
[52] U.S. Cl. .............................. 371/68.1; 340/146.2
[58] Field of Search .............. 371/68.1, 68.2, 68.3, 371/67.1, 61, 62; 364/200, 900; 340/146.2

[56] References Cited

U.S. PATENT DOCUMENTS

| | | | |
|---|---|---|---|
| 3,618,015 | 11/1971 | Homonick | 371/68.1 X |
| 3,634,769 | 1/1972 | Sleater | 340/146.2 X |
| 3,660,647 | 5/1972 | Pryor | 340/146.2 X |
| 3,810,119 | 5/1974 | Zieve | 371/68.3 X |
| 4,366,535 | 12/1982 | Cedolin | 364/200 |
| 4,566,101 | 1/1986 | Skonieczny | 371/68.1 X |
| 4,625,314 | 11/1986 | Witte | 371/68.2 |
| 4,821,271 | 4/1989 | Kini | 371/68.1 |

OTHER PUBLICATIONS

H. M. Buettner et al.: "Comparison Circuit", IBM Technical Disclosure Bulletin, vol. 23, No. 5, Oct. 1980, pp. 2032-2034.

Primary Examiner—Robert W. Beausoliel
Attorney, Agent, or Firm—William P. Skladony; Ronald E. Myrick; Barry N. Young

[57] ABSTRACT

A masking comparison circuit outputs a signal "non-correspondence" if two binary signals received are unequal. However, there are provided masking means for masking this non-correspondence signal unless both binary signals for some time have been stable and, moreover, different. A comparison circuit of this kind forms part of, for example a data processing device based on redundancy.

17 Claims, 2 Drawing Sheets $a = d(a) \quad \wedge \quad b = d(b) \quad \wedge \quad a \neq b$

COMPARISON CIRCUIT FOR MASKING TRANSIENT DIFFERENCES

FIELD OF THE INVENTION

The invention relates to a masking comparison circuit for comparing two binary signals. It has been found that data processing devices and digital circuits in general, exhibit errors. Such errors may be intermittent (soft errors) or persistent (hard errors). In order to enhance the reliability, the data processing device is often constructed in duplicate. A comparison mechanism of some kind then detects a signal state difference, if any, between the two data processing devices and a suitable step is taken in response thereto. Such a step may be, for example a retry operation, a self-test of the devices and selection of the best device, allocation of a task to a further device, activation of a correction mechanism by way of redundancy at the level of the information signals, and so on. Problems of this kind can also occur when the device is constructed, for example in triplicate; it is then detected whether at least two sub-devices operate consistently with respect to one another.

SUMMARY OF THE INVENTION.

In such a set-up it may occur that, even though the two input signals are the same when considered over a prolonged period of time, differences can briefly occur. This may be the case notably in asynchronous systems, but even when central synchronisation is provided, for example due to different delays of clock signals for the various sub-devices or different response speeds of the synchronised parts. It has been found that in such cases an undue error signal is often given. It is inter alia an object of the invention to construct a comparison circuit of the kind set forth so that such brief non-correspondences are masked. In accordance with one of the aspects of the invention, this object is achieved in that there is provided a comparison circuit for comparing two binary signals, characterized in that there are provided masking means for detecting a situation in which both binary signals are stable but different during respective minimum intervals, a "non-correspondence" signal being supplied only upon detection of said situation, said "non-correspondence" signal otherwise being masked. It has been found that masking means of this kind require only a limited amount of logic circuitry.

PRIOR ART REFERENCE

H. M. Buettner et al., COMPARISON CIRCUIT, IBM Technical Disclosure Bulletin, Vol. 23, No. 5, October 1980, p. 2032-2033, describe a comparison circuit for comparing a known signal A from a good device with a signal B from a device under test while the test is being run at functional speeds when −GATE(+RESET) is at a down level. The known art masks an error signal when the device under test exhibits an output signal change during the finite time when clock signal W is high. However, the known device stays silent also when the device under test foregoes a transition completely. This means that the known device would not fulfil the requirements of the present invention in signalling differences that would persist sufficiently long. Secondly, the known art presupposes a particular correct device, which the present invention does not. Third, according to the known art a clocked operation is disclosed. According to the present invention, the operation may be substantially or even completely asynchronous.

FURTHER ASPECTS OF THE INVENTION

In accordance with a second aspect of the invention, for both binary signals there is preferably provided a delay element over said critical intervals, the comparison circuit comprising two comparison gates, one of which receives the first binary signal and its delayed version in non-inverted form and the second binary signal and its delayed version in inverted form, all said logic values being reversed for the second comparison gate, an output gate being fed by output signals of the same sign of the two comparison gates. A circuit of this kind is particularly suitable when high bit/switching speeds are used. On the one hand, said critical interval/delay time must be chosen to be so long that small differences in, for example edge steepnesses are masked. On the other hand, the delay time may not be so long that, for example the absence of one bit in a bit series is not detected. The above aspect offers a simple circuit for use at high speeds. Notably, the combinatorial elements operate completely asynchronously. It should be noted that, for example, the delay elements could be constituted from clocked shift registers. Note that the delays could be mutually equally, but, alternatively, could exhibit some finite tolerance.

In accordance with a third aspect of the invention, preferably a delay element over said critical intervals is provided for both binary signals, the comparison circuit comprising four comparison elements which receive the first signal and the second signal, the first delayed signal and the second signal, the first signal and the second delayed signal, and the first delayed signal and the second delayed signal, respectively, an output gate detecting that none of the four comparison elements detects a correspondence situation in order to supply said "non-correspondence" signal in response thereto. This again results in a very simple circuit for operation at high speeds.

The invention also relates to a processing circuit, comprising two mutually corresponding or synchronous sub-devices, each of which produces a sub-result, and also comprising a comparison circuit system which is connected to the sub-device, there being provided an inhibit element which is controlled by said general "non-correspondence" signal in order to inhibit said sub-result on an external output of the processing circuit. The two sub-devices may be, for example respective, word-wise organised computers. A further aspect of the invention relates to the use of such a processing circuit in a data processing device which is based on redundancy and which signifies an alarm upon detection of a persistent "non-correspondence" state. This is attractive for error-detecting chips; the chip technology may then be conventional up to the bit level.

Further attractive aspects are described in further dependent Claims.

BRIEF DESCRIPTION OF THE FIGURES

The invention will be described in detail hereinafter with reference to some Figures. Therein.

DESCRIPTION OF SOME PREFERRED EMBODIMENTS

Figure 1:
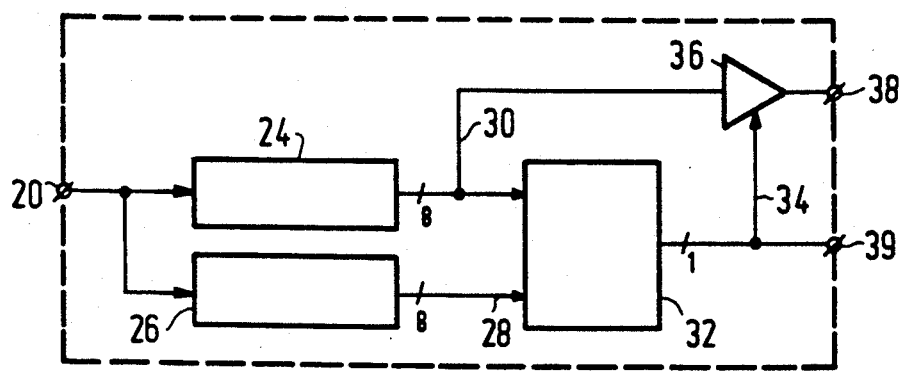
FIG. 1 shows a processing circuit in accordance with the invention.

FIG. 1 shows a processing circuit in accordance with the invention. An input signal comprising, for example 8 bits appears on input 20. This signal is applied to two mutually identical data processors 24, 26 which thus receive the same information and process the input information mutually asynchronously so as to form, for example 8-bit output information. This output information thus appears substantially simultaneously on lines 28, 30. The time discrepancy may amount to no more than the time interval d to be described hereinafter. Inputs and outputs need not be synchronised. The two sub-devices 24, 26 are mutually asynchronous in a sense that they are not controlled by one and the same clock; if only a single clock were used, there would be no redundancy against failure of the clock. Evidently, the two clocks are synchronised to some extent, for example in that they control a phase-locked loop of the other clock via a low-pass filter. In principle it would be permissible for only one central clock to be present, provided that its reliability is adequate. In practice time discrepancies can then still occur between the operations of the two sub-devices, for example due to different delay times of the clock signals, different threshold voltages for transitions between 0 and 1, and unequal edge-steepnesses in signal steps. In the case of correct operation of the device, these phenomena could be accepted to some extent without giving rise to malfunctioning.

Block 32 is a comparison circuit system. This system bit-wise compares the two bytes received, briefly masks non-correspondences, and forms an OR-function of the bit-wise formed "non-correspondence" signals, which signal appears on output 34. When this signal has the value "correspondence", gate 36 is driven to conduction and the signal of the line 30 appears on output 38. When the signal on the line 34 has the "non-correspondence" value, the signal on the line 30 is inhibited; moreover, the signal appears on output 39 in order to activate suitable steps (as described before) at a higher organisation level. For example, it is possible to activate an error correction mechanism (in channel 30) and to unblock the gate 36 as yet in the case of possible error correction. It is then also possible for the signal on the line 39 to be multivalent: 00: correct; 01: error correction takes place, "waiting"; 10: error correction not possible. The complete processing circuit of FIG. 1 can be accommodated on one or more chips thus provided with an error detection mechanism, which chips may also accommodate a variety of other functions.

Figure 2:
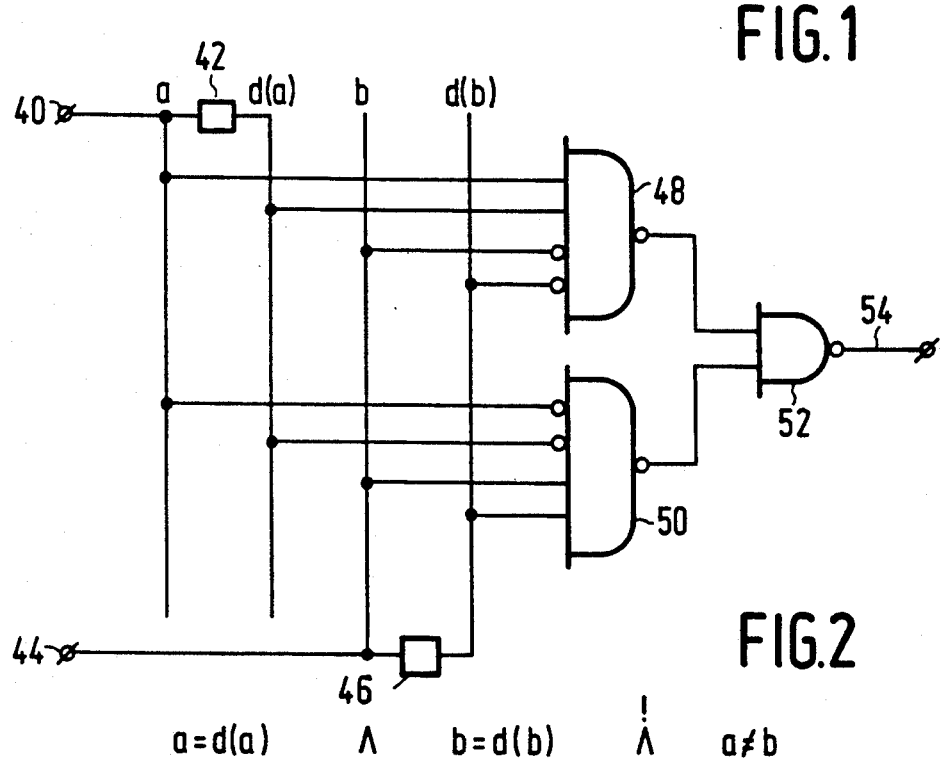
FIG. 2 shows a comparison circuit in accordance with the invention.

FIG. 2 shows a comparison circuit in accordance with the invention. Two binary signals a, b are to be compared. The signal a is received on input 40 and is delayed by a delayed element 42 over a critical interval d so as to form a signal d(a). The signal b is received on input 44 and is delayed over a critical interval d by a delay element 46 so as to form a signal d(b). Delay elements are standard components per se; they will not be elaborated herein for the sake of brevity. The minimum or critical intervals correspond to the maximum time difference between the signals a, b for which the circuit should still operate correctly. The critical intervals need not be exactly equal. In normal cases they may differ to such an extent that the effects caused by such a difference are still negligibly small. The four signals a, d(a), b, d(b) are combined in different ways in two respective NAND-gates 48, 50. In the gate 48 the signals a and d(a) are input in non-inverted form, the signals b and d(b) being input in inverted form. Thus, this gate outputs a logic 0 only if a=d(a)=1 and b=d(b)=0. This gate outputs a logic 1 in all other circumstances. The signals a and d(a) are applied to the gate 50 in inverted form and the signals b and d(b) are applied thereto in non-inverted form. Thus, this gate outputs a logic 0 only if a=d(a)=0 and b=d(b)=1. This gate outputs a logic 1 in all other circumstances. The output signals of the gates 48, 50 are applied to a NAND-gate 52. Thus, this gate outputs a logic 1 only if one of the two input signals is 0, that is to say if the signals a and b are constant and mutually different during at least the critical interval. This logic 1 thus signals a discrepancy which will be used further in the system.

Figure 3:
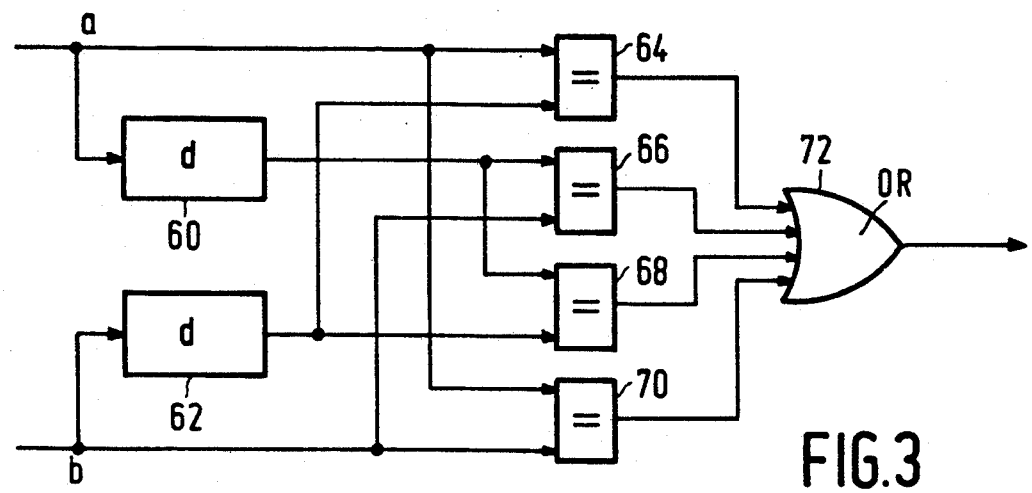
FIG. 3 shows a second embodiment thereof.

FIG. 3 shows a second embodiment of a comparison circuit. The two signals a and b are again delayed over the critical interval in delay elements 60, 62. In this case there are provided four comparators 64 (receives a and d(b)), 66 (receives b and d(a)), 68 (receives d(a) and d(b)), and 70 (receives a and b). The four comparators may be constructed, for example as a parallel connection of an AND-gate and a NOR-gate whose output signals are combined in a wired-OR-function. The comparators output a signal 1 if the two signals received have the same value. They output a zero if the two signals received differ momentarily. The output signals of the four elements 64, 66, 68, 70 are combined in a logic OR-gate 72. A logic 0 on the output of the gate 72, therefore, signals the occurrence of a discrepancy which has lasted sufficiently long, subject to the condition that none of the signals has exhibited more than one signal transition during the critical interval. The delay times in the elements 60, 62 need in principle not be exactly the same. In any case, these delay times may not exceed the value corresponding to approximately the relevant pulse widths in the digital signals a, b themselves. Furthermore, in principle a variety of versions of the circuits of the FIGS. 2, 3 can be used. The basic principle consists in that first a deviation between the signals a, d(a), b, d(b) is detected while subsequently the general "noncorrespondence" signal is formed without introduction of further delay (except for the standard gate and interconnection delays).

Figure 4:
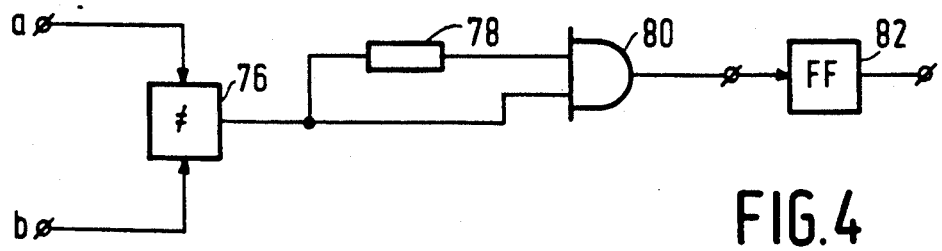
FIG. 4 shows a third embodiment thereof.

FIG. 4 shows a third embodiment of a comparison circuit. Therein, the two signals a, b are applied directly to an EXCLUSIVE-OR element, modulo-2 adder, or difference detector 76. The signal thus formed is applied directly to a logic AND-gate 80 and, via a delay element 78, again to the AND-gate 80. Therefore, this gate outputs a logic 1 if the two signals are unequal and already were so one critical interval earlier. To the output of the AND-gate 80 there is connected a data flipflop 82 which is synchronised by a clock signal (omitted for the sake of simplicity) or which acts as a set/reset (S/R) flipflop.

Figure 5:
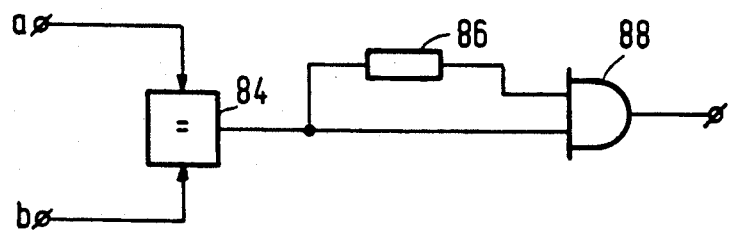
FIG. 5 shows a fourth embodiment thereof.

FIG. 5 shows a fourth embodiment of the comparison circuit. It comprises a comparison circuit 84, a delay element 86, and an OR-gate 88. When the latter gate outputs a low signal, the input signals are (have been) unequal at two instants which are spaced one critical interval apart. The principle of the FIGS. 4, 5, therefore, consists in that first non-correspondence between the signals a, b is detected and that only thereafter it is detected, utilising a delay element, whether this discrepancy has existed for a sufficiently long period of time.

Figure 6:
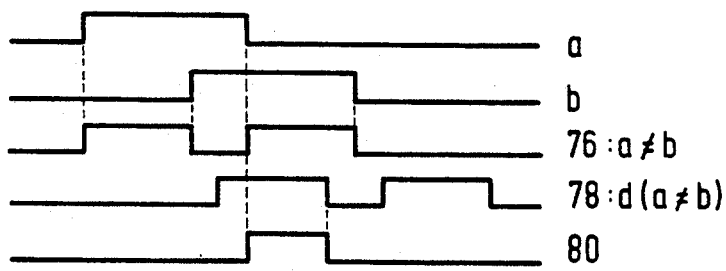
FIGS. 6, 7 show respective series of signal diagrams.
Figure 7:
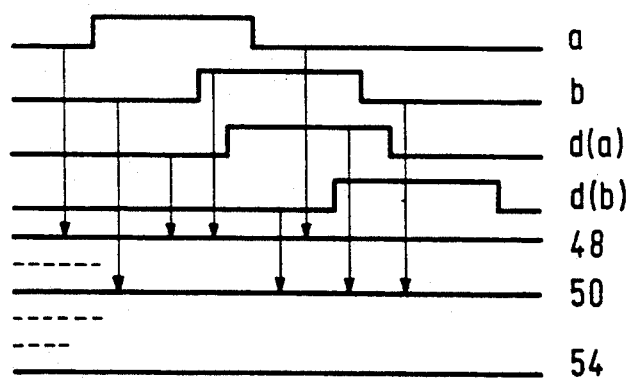

In this respect the FIGS. 6, 7 show two series of signal diagrams. FIG. 6 relates to the FIGS. 4, 5. The first path represents the signal a which is a pulse-shaped signal. The second path similarly represents the signal b; this signal is identical to the signal a, except for a delay. The third path represents the output signal of the element 76 in FIG. 4: no discrepancy exists between a and b during two intervals. The fourth path represents the output signal of the delay element 78. The fifth path represents the output signal of the AND-gate 80. In practice it may be that the signal pulses a, b as shown constitute elements of a pulse series having a minimum recurrent period T which corresponds to a recurrent frequency F. When the delay time of the element 78 is equal to d, it appears that the circuit shown in FIG. 4 operates correctly, subject to the condition that $F < \frac{1}{2} d$. In the time domain these signals paths similarly hold good for FIG. 5.

FIG. 7 shows signal paths relating to the FIGS. 2, 3, that is to say for the same values of the pulse lengths, the delay d, and the time difference between the signals a and b. The first four paths successively represent the signals a, b, d(a) and d(b). The fifth path represents the output signal of the gate 48. As denoted by the respective arrows, there is always at least one input signal which keeps the output signal of the gate 48 "high". The sixth path represents the output signal of the gate 50; it appears that this signal is also continuously kept high as indicated by the arrows. The seventh path represents the output signal of the gate 52. Contrary to FIG. 6, the output signal is continuously low and the non-correspondence signal is, therefore, masked. It has been found that this circuit operates correctly for pulses having recurrent frequencies of up to 1/d, i.e. the frequency range is a factor 2 higher than that of FIG. 6. In the time domain the paths of FIG. 7 hold good similarly for the circuit shown in FIG. 3, be it that notably the gates 48, 50 have been replaced by similarly operating gates with other signals.

Figure 8:
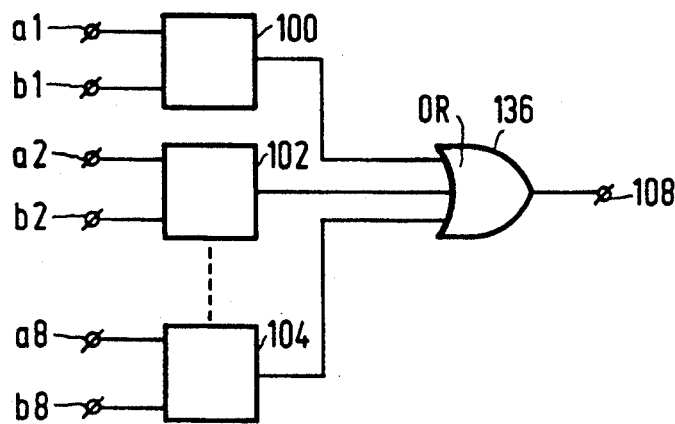
FIG. 8 shows a comparison circuit system in accordance with the invention.

FIG. 8 shows a comparison circuit system in accordance with the invention for two 8-bit numbers a1 ... a8 and b1 ... b8. For each bit-wise significance level there is provided a comparison circuit as described with reference to one of the above Figures (100, 102, ... 104). A 1 which indicates a non-correspondence situation between two equivalent bits then produces a general non-correspondence signal on output 108 of an OR-gate 106. When a 0 on the output of the bit stages indicates a non-correspondence situation, the same result is obtained by way of a conventional logic conversion.

I claim:

1. A comparison circuit for comparing first and second binary signals which are transmitted to said comparison circuit, said comparison circuit comprising:
   delay means which recieves the first and second signals transmitted to the comparison circuit and delays the further transmission of the first and second signals for a predetermined time interval "d"; and
   comparison means, coupled to the delay means, for comparing the first and second binary signals to determine whether the first and second signals correspond to one another, said comparison means being capable of outputting a non-correspondence signal which is dependent upon whether the first and second signals correspond to one another.

2. A comparison circuit as in claim 1, wherein said comparison means is constructed exclusively from synchronously operating circutry.

3. A comparison circuit as in claim 1, comprising first and second inputs for each of the first and second signals, the first inputs of the first and second signals being fed into said delay means for forming versions of the first and second signals respectively delayed by the time interval, said delay means having respective first and second outputs for the respective first and second delayed versions of the signals, and said comparision means further comprising gate means having four inputs respectively fed by the first and second inputs and by the first and second outputs for forming at an output of said gate means the non-correspondence signal.

4. A comparison circuit as in claim 3, wherein said gate means comprises a first comparison gate means fed by the four inputs for detecting when any of the first signal, the delayed version of the first signal, the inverse of the second signal, and the inverse of the delayed version of the second signal has a predetermined logic state, a second comparison gate means fed by the four inputs for detecting when any of the second signal, the delayed version of the second signal, the inverse of the first signal, and the inverse of the delayed version of the first signal has the predetermined logic state, and said gate means further comprises a combining gate means fed by the outputs of said first and second comparison gate means, for forming the non-correspondence signal when neither said first nor said second comparison gate means detects the predetermined logic state.

5. A comparison circuit as in claim 3, wherein said gate means comprises first, second, third, and fourth two-input comparison gate means, said first comparison gate means fed for detecting whether the logic states of the first signal and delayed version of the second signal are the same or different, said second comparison gate means fed for detecting whether the logic states of the second signal and the delayed version of the first signal are the same or different, said third gate comparison means fed for detecting whether the logic states of the delayed versions of the first and second signals are the same or different, said fourth comparison gate means fed for detecting whether the logic states of the first and second signals are the same or different, and said gate means further comprises a combining gate means fed by outputs of said first, second, third and fourth comparison gate means for forming the non-correspondence signal when any of said first, second, third, and fourth comparison gate means detects different logic states.

6. A comparison circuit system for comparing a plurality of sets of first and second binary signals which are transmitted to said system, said system comprising:
   a plurality of comparison circuits each of which is for comparing a given set of first and second binary signals;
   delay means which recieves the first and second signals transmitted to each of said comparison circuits and delays the further transmission of the first and second signals for a predetermined time interval "d";
   comparison means, coupled to the delay means, for comparing the first and second binary signals to determine whether the first and second signals correspond to one another, said comparison means being capable of outputting a non-correspondence signal which is dependent upon whether the first and second signals correspond to one another; and general combination gate means for receiving the outputs of each of the comparison circuits, said combination gate means outputting a non-correspondence signal if any of the comparison circuits output a non-correspondence signal.

7. The comparison circuit system as in claim 6, wherein each of said comparison circuits comprises first and second inputs for each of the first and second signals, the first inputs of the first and second signals being fed into said delay means for forming delayed versions of the first and second signals respectively, said delay means having respective first and second outputs for the respective first and second delayed versions of the signals, and said comparision means comprsing gate means having four inputs respectively fed by the first and second inputs and by the delayed versions of the first and second signals, said gate means outputting the non-correspondence signal.

8. The comparison circuit system as in claim 7, wherein said gate means comprises a first comparison gate means fed by the four inputs for detecting when any of the first signal, the delayed version of the first signal, the inverse of the second signal, and the inverse of the delayed version of the second signal has a predetermined logic state, a second comparison gate means fed by the four inputs for detecting when any of the second signal, the delayed version of the second signal, the inverse of the first signal, and the inverse of the delayed version of the first signal has the predetermined logic state, and said gate means further comprises a combining gate means fed by the outputs of said first and second comparison gate means, for forming the non-correspondence signal when neither said first nor said second comparison gate means detects the predetermined logic state.

9. The comparison circuit system as in claim 7, wherein said gate means comprises first, second, third, and fourth two-input comparison gate means, said first comparison gate means fed for detecting whether the logic states of the first signal and delayed version of the second signal are the same or different, said second comparison gate means fed for detecting whether the logic states of the second signal and the delayed version of the first signal are the same or different, said third gate comparison means fed for detecting whether the logic states of the delayed versions of the first and second signals are this same or different, said fourth comparison gate means fed for detecting whether the logic states of the first and second signals are this same or different, and said gate means further comprises a combining gate means fed by outputs of said first, second, third and fourth comparison gate means for forming the signal when any of said first, second, third, and fourth comparison gate means detects different logic states.

10. The comparison circuit system as in claim 6, wherein said general combination gate means comprises an OR gate.

11. A processing system for receiving a binary signal input, processing the signal, and providing a signal output, said processing system comprising:

input signal means;

first and second processing means, both of which are coupled to the input signal means, and both of which process the signal and respectively output a first processed signal and a second processed signal;

delay means coupled to said first and second processing means for delaying the transmission of the first and second signal a predetermined time interval "d" after the transmission of the first and second processed signals by the first and second processing means; and comparison means for comparing the first and second processed signals to determine whether the first and second signals correspond to one another, said comparison means being capable of outputting a non-correspondence signal which is dependent upon whether the first and second signals correspond to one another.

12. A processing system as in claim 11, wherein said processing means operate in mutual synchronism.

13. A processing system as in claim 11, wherein said processing means operate mutually asynchronously.

14. The processing system as in claim 11, wherein said comparison means comprises first and second inputs for each of the first and second signals, the first inputs of the first and second signals being fed into said delay means for forming delayed versions of the first and second signals respectively, said delay means having respective first and second outputs for the respective first and second delayed versions of the signals, and said comparison further comprises gate means having four inputs respectively fed by the first and second inputs and by the delayed versions of the first and second signals, said gate means outputting the non-correspondence signal.

15. The processing system as in claim 14, wherein said gate means comprises a first comparison gate means fed by the four inputs for detecting when any of the first signal, the delayed version of the first signal, the inverse of the second signal, and the inverse of the delayed version of the second signal has a predetermined logic state, a second comparison gate means fed by the four inputs for detecting when any of the second signal, the delayed version of the second signal, the inverse of the first signal, and the inverse of the delayed version of the first signal has the predetermined logic state, and said gate means further comprises a combining gate means fed by the outputs of said first and second comparison gate means, for forming the non-correspondence signal when neither said first nor said second comparison gate means detects the predetermined logic state.

16. The processing system as in claim 14, wherein said gate means comprises first, second, third, and fourth two-input comparison gate means, said first comparison gate means fed for detecting whether the logic states of the first signal and delayed version of the second signal are the same or different, said second comparison gate means fed for detecting whether the logic states of the second signal and the delayed version of the first signal are the same or different, said third gate comparison means fed for detecting whether the logic states of the delayed versions of the first and second signals are this same or different, said fourth comparison gate means fed for detecting whether the logic states of the first and second signals are the same or different, and said gate means further comprises a combining gate means fed by outputs of said first, second, third and fourth comparison gate means for forming the signal when any of said first, second, third, and fourth comparison gate means detects different logic states.

17. The processing system as in claim 11, further comprising output gating means for inhibiting the transmission of the first processed signal in the event that the comparison means outputs a non-correspondence signal, said comparison means being coupled to the output gating means.

* * * * *